(12) United States Patent
Sanchez

(10) Patent No.: US 11,330,692 B1
(45) Date of Patent: May 10, 2022

(54) LIGHTING CONTROLLER

(71) Applicant: Alejandro Sanchez, Miami Lakes, FL (US)

(72) Inventor: Alejandro Sanchez, Miami Lakes, FL (US)

( * ) Notice: Subject to any disclaimer, the term of this patent is extended or adjusted under 35 U.S.C. 154(b) by 0 days.

(21) Appl. No.: 17/346,283

(22) Filed: Jun. 13, 2021

(51) Int. Cl.
*H05B 47/155* (2020.01)
*A01G 7/04* (2006.01)
*H05B 47/105* (2020.01)

(52) U.S. Cl.
CPC .......... *H05B 47/155* (2020.01); *A01G 7/045* (2013.01); *H05B 47/105* (2020.01)

(58) Field of Classification Search
CPC ...... H05B 47/11; H05B 45/20; H05B 47/105; H05B 47/175; H05B 45/12; H05B 47/10; H05B 47/115; H05B 47/125; H05B 47/16; H05B 47/165; A01G 31/06; A01G 7/045; A01G 9/249; A01G 7/00; A01G 2031/006; A01G 27/003; A01G 31/02; A01G 9/023; A01G 9/24; A01G 9/246; A01G 9/247; A01G 9/26; A01G 25/16; A01G 27/001; A01G 27/005; A01G 31/00; A01G 9/16; A01G 9/18; A01G 9/20; A01G 13/06; A01G 24/10; A01G 24/15; A01G 24/18; A01G 24/25; A01G 24/28; A01G 24/46; A01G 27/008; A01G 27/02; A01G 31/04; A01G 31/047; A01G 7/06; A01G 9/022; A01G 9/025; A01G 9/027; A01G 9/029; A01G 9/0293; A01G 9/14; A01G 9/1423; Y02A 40/25
See application file for complete search history.

(56) References Cited

U.S. PATENT DOCUMENTS

| | | | | |
|---|---|---|---|---|
| 7,617,057 B2* | 11/2009 | May | .......................... | A01G 9/16 |
| | | | | 702/62 |
| 8,836,504 B2* | 9/2014 | Kohler | ..................... | A01G 7/00 |
| | | | | 340/540 |
| 2019/0082612 A1* | 3/2019 | Bitetti | ...................... | A01H 6/28 |

* cited by examiner

*Primary Examiner* — Monica C King
(74) *Attorney, Agent, or Firm* — Christopher J. VanDam, P.A; Chris Van Dam

(57) ABSTRACT

A multiple light controlling system where a primary control pod receives a lighting schedule wirelessly and re-communicates the lighting schedule to a plurality of slaved secondary control pods via power line communication. Each of the control pods may in turn control several lights in a growing zone. Each zone may have its own lighting schedule to promote optimal plant development. Each of the control pods may also gather environmental or operational information and return that information to the primary control pod and ultimately to a remote computing device.

6 Claims, 3 Drawing Sheets

| TIME FROM START (WEEK) | STAGE | TIME ON (HRS./DAY) | TEMP. (F°) |
|---|---|---|---|
| 1 | Germination | 0 | 70-90 |
| 2-8 | Vegetative | 18-24 | 70-90 |
| 9-16 | Flowering | 11-12 | 70-90 |

Fig. 3

LIGHTING CONTROLLER

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to lighting control and more particularly, to an improved device and method of use to control grow lights in distinct zones by power line communication.

2. Description of Related Art Including Information Disclosed Under 37 CFR 1.97 and 37 CFR 1.98

Several designs for lighting controllers have been designed in the past. None of them, however, include a primary control pod that receives a controlling signal that in turn delivers a signal through a power line communication network to control a specific network of secondary control pods.

Applicant believes that the closest references correspond to a variety of commercially available wireless power controllers. An example of one such device is embodied in U.S. Pat. No. 10,656,608 issued to Lerner. The Lerner patent is generally a facility management system where power controllers have a wireless connectivity. This design is generally used in institutions such as hotels for controlling appliances or lighting. The Lerner device may also employ temperature and humidity sensors.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main object of the present invention to provide a controller network for controlling appliances such as lighting where a primary control pod interacts with a computing device on a local or wide network and where the primary control pod relays control and commands to a plurality of secondary control pods, each controlling an individual appliance (e.g. zones of lights).

It is another object of the present invention to provide a way to seamlessly control a plurality of light zones with the operator sending instructions only to the primary control pod.

It is yet another object of the present invention to effectively control a plurality of secondary control pods and their associated light zones to amend lighting schedules as well as providing optional environmental monitoring features.

It is yet another object of this invention to provide such a device and associated method to control lighting zones that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention exists in the details of construction and combination of parts as will be more fully understood from the following description, when read in conjunction with the accompanying drawings in which:

FIG. 3 is a table showing an example of a lighting control schedule.

DETAILED DESCRIPTION OF THE INVENTION

Figure 1:
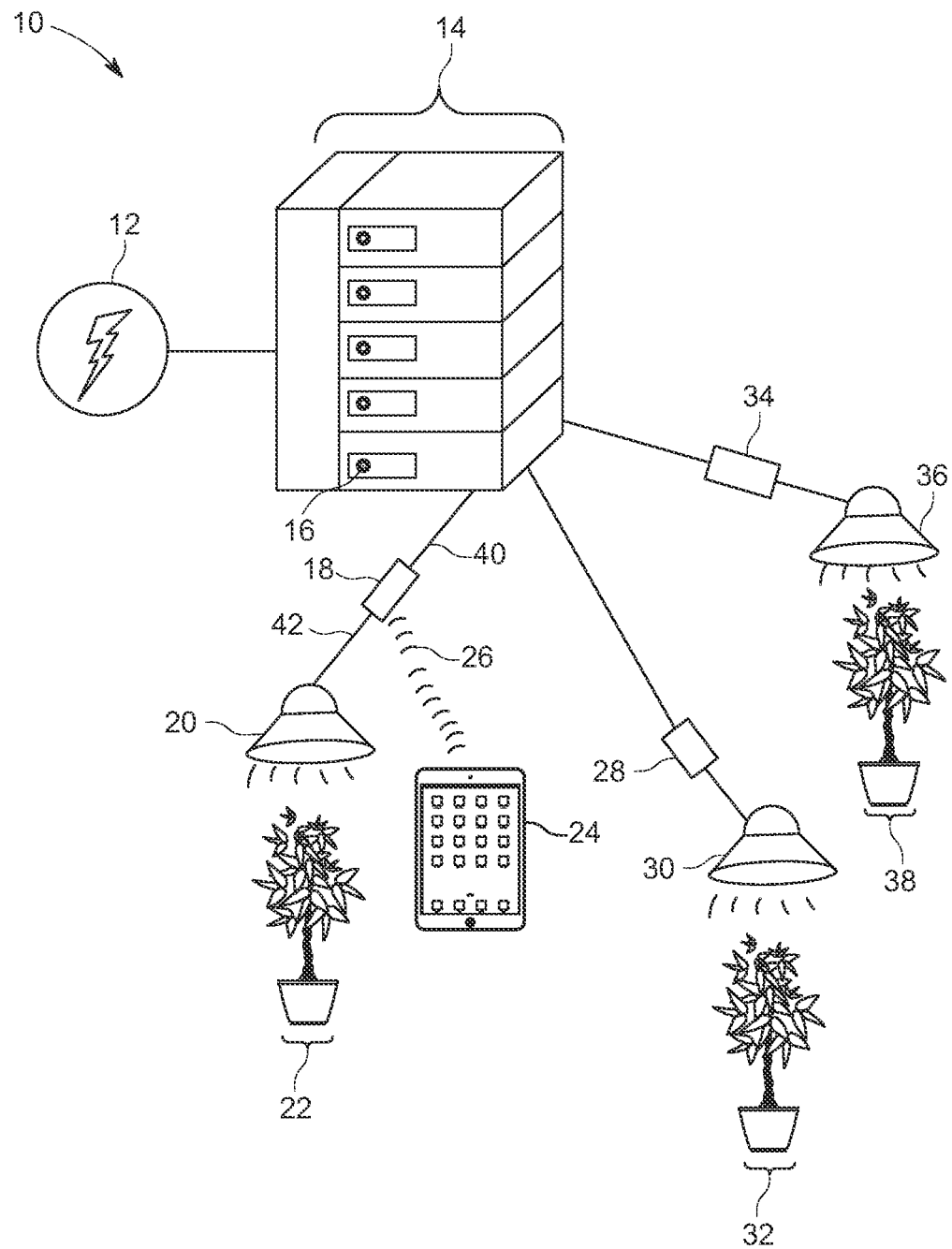
FIG. 1 shows a stylized plan view of a lighting controller layout.

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the lighting controller, the controller, the machine, the system, the process or other similar terms. These terms may be used interchangeably as context requires and from use the intent becomes apparent. The masculine can sometimes refer to the feminine and to the neuter and vice versa. The plural may include the singular and singular the plural as appropriate from a fair and reasonable interpretation in the situation.

Indoor plant growing operations may often have a plurality of electric lights to provide light to the growing plants. Greenhouses or other indoor growing facilities may also be subdivided into different zones for different stages in the life cycles of plants. For example, seedlings that are yet to be hardened may need to be under gentler light. Whereas, more mature plants can need more light to maximize their growth rate. Certain plants will also change their growing habits based on the length of light versus a dark period.

For example, cannabis plants can have long hours of light application during the vegetative stage. When the light cycle is reduced and the dark time is increased, the plants will transition from a vegetative stage to a flowering stage. The growers carefully manage the times that the lights are operating and the periods where the plants are shielded from light and remain in darkness.

Larger indoor growing operations may also have zones of lights each on a specific electrical circuit. Some lights have a significant power draw and a limited number may be on any given circuit. A way to control zones of lights, each zone having a plurality of light fixtures, without controlling each individual light is a great benefit to the indoor growing industry by, among other things, allowing an operator to control many lights with one controller through a simple power line communication network to which the lights and the respective control pods are connected.

In typical plant growing operations, a grow timer is used to control a light's on/off schedule. For example, in the case of cannabis, one light with it's controlling timer may cover about a four feet by four feet area with about two to six plants. The timer must be set accordingly for the period and given schedule applicable to the plant's stage. Where several lights are employed, this requires individually and manually setting a plurality of timers as applicable to the size and the number of lights included in the given zone which can result in a very time consuming task. A more efficient and effective device to manage this is needed.

Referring now to the drawings, where the present invention is generally referred to with numeral 10, it can be observed that it basically includes, among other shown and described features, a power source 12, a panel 14, a breaker 16, a primary control pod (PCP) 18, a light 20, a zone 22, a device 24, a signal 26, a secondary control pod (SCP) 28, a light 30, a zone 32, a secondary control pod (SCP) 34, a light 36, a zone 38, a cable 40, a cable 42, an outlet 44, an indicator 46, a thermometer 48, a port 50, a ballast 52, a plug 54 and a controller 56.

Looking at FIG. 1, a circuit panel 14 is provided with a plurality of individual circuits. The power source 12 enters the panel 14 at a bus that services the individual breakers and respective circuits in the panel 14. One of the circuits in the panel 14 is represented by breaker 16. Breaker 16 is powered by the power source 12, similar to the other separate circuits in the panel 14. The breaker 16 supplies power to a plurality of lighting zones represented by light 20, light 30 and light 36.

It should be appreciated that each of the lights 20, 30 and 36 may represent an individual light fixture or a group of several light fixtures that shine light on a particular area of growing plants. The zone 22 is covered by light 20. Zone 22 may represent a single plant or many plants that are covered by several lights 20. Similarly, zone 32 may have several plants under several lights 30 and zone of 38 may have several plants under light 36.

In a practical application, light 20 may represent the light emitted in a particular grow room identified as zone 22. Likewise, light 30 may represent another room comprising zone 32 and light 36 and yet another room covering zone 38. In some applications the zones 22, 32 and 38 may be adjacent sections of a long greenhouse.

The particular configuration and location of the zones relative to each other is not critical to the functioning of this invention except that the family of zones covered by their respective lights are on a single bus to allow power line communication. The zones should also avoid light from spilling over to adjacent zones contrary to the growing schedule or recipe of light times. The individual breakers can all be on the same power line communication network when sharing the same bus in the panel. Optionally, an individual circuit or multiple circuits can be combined into its own power line communication network.

Continuing the example of FIG. 1, the panel 14 may have a family of lights on each of the several shown breakers. Each family of lights has one or more secondary control pods that are operated and controlled by a primary controller pod on that individual circuit with respective circuit breaker. All of the breakers in the panel 14 could be on the same circuit and be part of the power line communication network linking many primary and secondary controllers.

One of the lights is designated as a primary light. In the example in FIG. 1, light 20 is the primary light as indicated by the primary control pod 18 located between the light 20 and breaker 16. Cable 40 on one end connects the breaker 16 to the primary control pod 18. Cable 42 in turn delivers the electrical power from the primary control pod 18 to the light(s) 20 covering zone 22.

It should be appreciated that the power line communication network may be able to communicate through an entire bus of the panel 14 and not be limited to one breaker 16 or single circuit. Each of the breakers or circuits and sub-circuits attached to the main building supply may be on the network and allow PLC communication to all the controllers in the building. Some circuits could also be isolated in the building to essentially have multiple discrete PLC networks each stemming from one panel or sub-panel.

Multiple secondary controllers may be grouped together and controlled by one or more primary controllers. A primary controller may control one or more groups of secondary controllers. For example, a seedling room may have multiple secondary controllers, all controlled or programmed by a single primary controller. Similarly, any of several primary controllers could control or program any individual secondary controller on the network.

Figure 2:
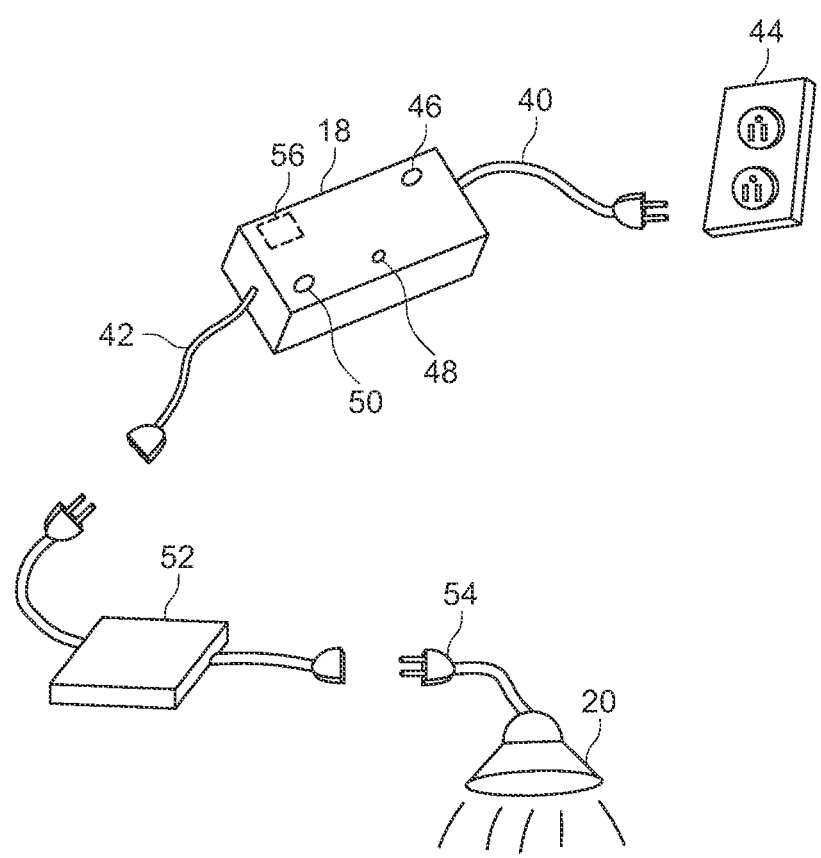
FIG. 2 shows a stylized perspective view of an individual primary control pod and its associated elements.

FIG. 2 shows a detail of the primary control pod 18. Outlet 44 is provided that is on the circuit connected to breaker 16 along with the secondary control pods 28 and 34. The cable 40 connects to outlet 44 to deliver electrical power to the primary control pod 18.

Although a typical plug and outlet combination is shown in FIG. 2, it should be appreciated that any means of connecting the primary or secondary control pods electrically to the circuit associated with breaker 16 may be utilized. For example, the control pods may be directly hardwired into the breaker 16 circuit.

Light 20 represents any type of single light or several lights shining on zone 22. Some types of lights 20, for example LEDs, generally include an onboard micro-controller (eg. COB LED) and do not need a ballast. Halogen or incandescent lights generally do not include a ballast. Other types of lights 30 or 36, such as high-pressure sodium, florescent and HID lights will require a ballast 52 placed in line between the primary control pod 18 and the light 20.

Similar to the primary control pod 18, any secondary control pod, for example secondary control pods 28 and 34 may or may not have a ballast, similar to the ballast 52, depending on the nature of the respective light 30 and light 36. The same criteria for needing a ballast 52 with the primary control pod 18 equally applies to any secondary control pod.

The primary control pod 18 is generally a controllable switch to allow electricity to flow from the circuit connected to breaker 16, ultimately to the light 20. The primary control pod 18 includes an electronic controller 56. The controller 56 is essentially a microcircuit that controls the functions of the primary control pod 18 and stores the schedules. The controller 56 is essentially a small computer that controls the several components of the primary control pod 18. The primary control pod 18 may implement the power line communication protocol to the secondary control pods 28 or 34.

The primary control pod 18 may optionally have a visible indicator 46. The indicator 46 may be a display with information or it may be one or several lights to show particular functionality and operational conditions of the primary control pod. For example, the indicator 46 may show visibly that the hand-held portable device 24 is wirelessly connected to the primary control pod 18, the temperature as registered by the thermometer 48, the connection of an auxiliary device at the port 50, the presence of a power supply, the status of whether the light 20 is being powered or any other feature or parameter that an operator may desire.

The primary control pod 18 might not have an associated light. It may act as to receive a command signal from the portable device 24 and relay that command to the secondary controllers by power line communication or other controlling means disclosed herein.

The portable device 24 is generally a hand-held computing device. The device 24 may connect wirelessly to the primary control pod 18 by a signal 26 for two way communication of data. Alternatively, a computing device 24 may be directly connected to the port 50 to send and receive data between the primary control pod 18 and the device 24 in a similar fashion as the wireless signal 26.

The wireless device 24 may program the controller 56 of the primary control pod 18 with parameters selected by the user. For example, a light schedule as shown in FIG. 3 may be sent to the controller 56 to control the time the light 20 is in operation. The device 24 can send a long-term programming schedule to the memory in the controller 56. Alternatively, when the grower wants to change the hours per day that the light 20 is operational, they merely instruct the device 24 to sends a signal 26 to the controller 56 to amend its operation. The schedules and other information for and from each of the secondary control pods is also sent through the primary controller 18 to the computing device 24.

The device 24 may also set other parameters in the primary and secondary control pods. An operator of the device 24 can set a threshold temperature at which to reduce or shutdown the electrical power delivered to any of the lights based on the detected temperature. In one example the temperature is obtained from a thermometer 48 on any primary or secondary controller.

For example, if the temperature in the grow room (or a zone, for example, zone 22) exceeds approximately 90° F. the light 20 may be disabled for a preset period of time to allow the temperature in the grow area to be reduced and avoid harm to the plants or equipment. Similarly, the thermometer 48 may be monitored by the controller 56 and if a potential issue exists and alert can be sent to the operator by a signal from any of the control pods, through the primary control pod 18, to the computing device 24 where the information is available to the operator.

A secondary controller may be connected to a fan, vent, water control valve, other temperature controlling valve and/or an air conditioning unit that can detect and over or under temperature with an environmental sensor and correct the condition to save the health of the plants. This may be done automatically and/or supply an alert to the operator of the system for a remedy. A sensor on any of the primary or secondary control pods could be used to detect an anomaly and trigger such a corrective remedy on that secondary controller with the associated temperature correcting means.

The primary control pod 18 may continually monitor and provide data to the operator using the device 24. The thermometer 48 may take readings, for example every minute, and report that information to the device 24. It should be appreciated that thermometer 48 is representative of any types of environmental sensors that all may be present on the primary control pod 18. By way of example, these may include photo/light sensors, carbon dioxide sensors, oxygen sensors, humidity, temperature or any other commercially available environmental sensor.

The computing device 24 is representative of any computing device. These may include, a personal computer, a tablet, a phone, a specialized terminal or any other electronic device that can interface with the operator of the system and provide control to the primary control pod 18. In an important example of the system, the device 24 is a portable a tablet that has a easy to use touch screen interface in a sleek package with wireless capability to both send and receive a signal 26 to and from the primary control pod 18.

The port 50 may be used in conjunction with, or as an alternate to, a wireless connection exemplified by signal 26. The port 50 may provide a wired interface between the primary control pod 18 and the computing device 24. The port 50 may connect the primary control pod 18 to a local area network (LAN) or through the broader internet over a wide area network (WAN) connection. Similarly, the wireless signal 26 may also be directly connected, for example by a local router, to the internet so that a computing device remote to the system may receive information from the primary control pod 18 and deliver instructions to the primary control pod 18 from anywhere in the world.

The secondary control pods 28 and 34 may be structurally identical to the primary control pod 18 in any of its variations and with any of the features and capabilities described herein. They may have the same sensors and ability to communicate wirelessly or wired to a network. The primary difference between the secondary control pods 28 and 34 is that they are slaved to the primary control pod 18. In other words, the primary control pod 18 receives instructions (in the form a recipe, script, schedule or other similar set of prescribed parameters) from the device 24 and relays those instructions onto any associated secondary control pods, such as 28 and 34 as shown in FIG. 1. In other words, the characterization of primary versus secondary is more in the user designated role that they play in the network than any structural differences.

Each secondary control pod associated with a primary control pod 18 is on the same breaker 16 of a panel 14. There may be more than the two secondary control pods shown in the drawings connected to any particular breaker. For example, there may be dozens or more of secondary control pods slaved to a primary control pod on any specific breaker 16. Similarly, the power line communication network may encompass all the circuits in a panel so therefore all the breakers 16 in a panel 14 may be on the same network and controlled by one or more primary controllers in a network or more broadly over the internet.

An individual breaker 16 (or the panel 14 as a whole) may also have another independently controlled primary control pod that may be associated with one or more secondary control pods in slave mode to that other primary control pod. Each primary and secondary control pod will have its own unique identifying signature on the network. Essentially this is a ID or serial number for each device to identify it individually.

Because the primary control pod 18 and each of the secondary control pods 28, 34 and any additional secondary control pods are on the same breaker 16 circuit (or an entire panel 14 circuit) they are all electrically connected to each other. The power lines connecting each of the control pods are able to communicate to each other by power line communication (PLC) that acts similar to a local network.

Because each of the control pods on a single breakers 16 share a common electrical connection they can communicate with each other digitally or analog over the power wires supplying electricity to each of the control pods. This is a robust and hardwired communication system. It also allows the potential for separate networks on a different breakers or a network may span several breakers in a breaker box or building circuit.

For example, different breakers might be used for different stages or different rooms of growing plants. In another example, one network may cover different zones of plants in different growing stages. To achieve this, each of the control pods including the primary control pod and secondary control pods, have a unique identifier. The primary control pod 18 can then send signals specific to each individual secondary control pod to reprogram each individual controller or to directly turn on and off the lights. Further each of the environmental sensors or other data information may be returned to the primary control pod 18 with the unique identifier to provide information of where that environmental information was detected and send it to the computing device 24.

Since each of the control pods, including both primary and secondary control pods, may have wireless communications capability they could be adapted to transmit data between any of the control pods including environmental sensor information and control signals.

The timing of the light cycles may be controlled by a clock or timer that is software based in the computing device 24 or in the primary control pod's 18 integrated controller 56. Each of the secondary control pods could also have a clock or timer built into their controller 56 so that once the secondary control or pods receive a lighting schedule they can run autonomously using that schedule until a new schedule is provided from the primary control pod 18.

In one embodiment of the invention, the control pods, whether primary or secondary, are simply inserted between the power supply on a single breaker 16 and the light or lights. Each control pod may be adapted with plugs that fit the anticipated lighting and power supply so it is plug and play.

Every control pod preferably has the ability to monitor the power consumption of the light or lights that it feeds. This may be important for determining whether a ballast or light may be in a failure mode. This may be indicated by an unusually high or low power load or power consumption passed through that control pod. A control pod sensing power uses outside of expected parameters can turn off the load to prevent risk of over-voltage damage (e.g. fire). Equally, a control pod may detect a low or undervoltage condition or any other abnormal load or electrical irregularities to automatically cut off power and/or notify an operator of the condition.

The primary controller may be sometimes referred to as a master controller and a secondary controller may be referred to as a slave controller. These terms can be used interchangeably. In one version of the design the primary and secondary controllers are physically materially similar. A setting in the device determines whether it acts as a primary or secondary controller. The device 24 may be used to program the controller to designate it as primary or secondary. Similarly, an electronic or physical switch on the device may control its primary or secondary functionality. Because each of the controllers has a unique identifier, the primary or secondary characteristics can be associated and programmed to a specific controller to achieve its character.

An important version of the invention can be fairly described as a multiple light controlling system or device comprised of a computing device, a primary control pod and a secondary control pod. The primary control pod is between a power source and a first light or set of lights. The second control pod is between the same power source and a second light or set of lights. The power source is open and adapted to allow power line communication between the primary control pod and a secondary control pod so that the primary control pod and the secondary control pod can be in two way communication. The computing device is programmed with a schedule (also characterized as a recipe, prescription, program of other similar term) by the operator of the system that is unique to each the primary control pod and the secondary control pod. The computing device then communicates both the first and second schedules to the primary control pod. The primary control pod then transmits the second schedule to the secondary control pod by means of power line communication over the power lines that connect the primary control pod and the secondary control pod through the power source. The primary control pod follows the first schedule and the secondary control pod follows the second schedule to allow power to flow into the respective lights to trying on to the plants being grown.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A multiple light controlling system comprised of a computing device, a primary light controller and a secondary light controller;

the primary light controller is electrically connected between a power source and a first light;

the secondary light controller is electrically connected between the power source and a second light;

the power source is open to allow power line communication between the primary light controller and the secondary light controller;

the computing device is programmed with a single on-off schedule for both the first light and the second light;

the computing device communicates the single on-off schedule only to the primary light controller;

the primary light controller re-transmits the single on-off schedule to the secondary light controller through power line communication and the single on-off schedule is programmed into the secondary light controller;

the primary light controller and the secondary light controller each allow the power source to flow into the respective first and second lights according to the single on-off schedule.

2. The multiple light controlling system of claim 1 further characterized in that the secondary light controller includes an environmental sensor that collects an environmental data and communicates the environmental data to the primary light controller and then the primary light controller re-transmits the environmental data to the computing device.

3. The multiple light controlling system of claim 1 further characterized in that the first light and the second light are each a plurality of light emitting fixtures.

4. The multiple light controlling system of claim 2 further characterized in that if the environmental data from the secondary light controller exceeds a predetermined value then an alert is communicated to the primary light controller and the secondary light controller takes a corrective measure.

5. The multiple light controlling system of claim 4 further characterized in that the corrective measure is disabling power provided to the light connected to that secondary light controller.

6. The multiple light controlling system of claim 1 further characterized in that the secondary light controller is operably connected to at least one of a fan, a vent, a valve and an air conditioning unit if an environmental sensor on the primary light controller or any secondary light controller detects a predetermined temperature threshold.

\* \* \* \* \*